(12) United States Patent
Saito et al.

(10) Patent No.: US 8,014,129 B2
(45) Date of Patent: Sep. 6, 2011

(54) STACKED SOLID ELECTROLYTIC CAPACITOR

(75) Inventors: Takeshi Saito, Sendai (JP); Takeo Kasuga, Sendai (JP); Koji Sakata, Sendai (JP)

(73) Assignee: NEC Tokin Corporation, Sendai-shi (JP)

( * ) Notice: Subject to any disclaimer, the term of this patent is extended or adjusted under 35 U.S.C. 154(b) by 294 days.

(21) Appl. No.: 12/292,930

(22) Filed: Dec. 1, 2008

(65) Prior Publication Data

US 2009/0168304 A1 Jul. 2, 2009

(30) Foreign Application Priority Data

Dec. 26, 2007 (JP) ................................. 2007-334346

(51) Int. Cl.
*H01G 5/35* (2006.01)
*H01G 4/228* (2006.01)
*H01G 9/04* (2006.01)

(52) U.S. Cl. .......................... 361/541; 361/533; 361/540

(58) Field of Classification Search .......... 361/540–541, 361/535, 538–539, 533, 531
See application file for complete search history.

(56) References Cited

U.S. PATENT DOCUMENTS

| | | | | |
|---|---|---|---|---|
| 5,187,650 A | * | 2/1993 | Kudoh et al. | 361/525 |
| 6,680,841 B2 | * | 1/2004 | Tadanobu et al. | 361/523 |
| 6,728,097 B2 | * | 4/2004 | Wada et al. | 361/533 |
| 2006/0215354 A1 | * | 9/2006 | Takatani et al. | 361/532 |
| 2008/0106855 A1 | * | 5/2008 | Utashiro | 361/541 |

FOREIGN PATENT DOCUMENTS

| | | | |
|---|---|---|---|
| JP | 2004281515 A | * | 10/2004 |
| JP | A-2004-281515 | | 10/2004 |
| JP | 2006032516 A | * | 2/2006 |
| JP | A-2006-093343 | | 4/2006 |
| JP | A-2007-165777 | | 6/2007 |
| WO | WO 2007004505 A1 | * | 1/2007 |

* cited by examiner

*Primary Examiner* — Eric Thomas
(74) *Attorney, Agent, or Firm* — Oliff & Berridge, PLC

(57) ABSTRACT

A stacked solid electrolytic capacitor includes a plurality of stacked solid electrolytic capacitor elements. Each solid electrolytic capacitor element includes an anode formed of a valve action metal, an anode section formed on an end of the anode, a dielectric formed on the surface of the valve action metal and including an oxide of the valve action metal, and a cathode layer formed on the dielectric. The cathode layers and the anode sections of the solid electrolytic capacitor elements are, respectively, connected to each other across the plurality of stacked solid electrolytic capacitor elements. A conductive layer extending in the stacking direction is formed on at least part of a side face of an area where the cathode layers of the solid electrolytic capacitor elements are formed.

4 Claims, 6 Drawing Sheets

STACKED SOLID ELECTROLYTIC CAPACITOR

BACKGROUND OF THE INVENTION

1. Field of the Invention

The present invention relates to a stacked solid electrolytic capacitor used in various electronic devices.

2. Description of Related Art

The demand for reliable capacitors having lower impedance, and smaller and thinner profiles has grown steadily in recent years as a result of ever increasing higher CPU speeds, higher integration, and space saving requirements in motherboards. Conventional approaches for meeting this demand include connecting in parallel multiple stacked ceramic capacitors.

Smaller, thinner stacked solid electrolytic capacitors having greater capacitance and lower impedance are being developed in order to realize large capacitance and low impedance, as achievable when several tens of stacked ceramic capacitors can be made up for by one single capacitor, having superior thermal resistance. To meet the above requirements, it has been proposed to achieve greater capacitance and lower ESR (equivalent series resistance) by stacking in parallel stacked solid electrolytic capacitors (for instance, Japanese Unexamined Patent Application Publication No. 2006-093343).

As disclosed in Japanese Unexamined Patent Application Publication Nos. 2004-281515 and 2007-165777, conduction in stacked cathode sections has been ensured in recent years by dipping the entire surface of the cathode sections of a stack of solid electrolytic capacitor elements in a conductive paste, followed by curing, with a view to reducing interface resistance, simplifying manufacture, and reducing thickness.

In conventional solid electrolytic capacitor element stacks, however, the desired ESR reduction afforded when the number of stacked layers increases by virtue of formula (1) below cannot be realized, and thus the advantages of stacking cannot be exploited, even when using technologies for connecting anodes in the stack, or when the entire surface of the stack cathode sections is coated with a conductive paste.

$$1/R = 1/R_1 + 1/R_2 \ldots 1/Rn \quad (1)$$

R: ESR of the stacked solid electrolytic capacitor $R_1, R_2 \ldots Rn$: ESR of individual stacked solid electrolytic capacitors

SUMMARY OF THE INVENTION

In light of the above, it is an object of the present invention to provide a stacked solid electrolytic capacitor that allows further reducing ESR by increasing the number of stacked layers.

According to an aspect of the present invention, there is provided a stacked solid electrolytic capacitor including: a plurality of stacked solid electrolytic capacitor elements. The each solid electrolytic capacitor element includes an anode formed of a valve action metal, an anode section formed on an end of the anode, a dielectric formed on the surface of the valve action metal and comprising an oxide of the valve action metal, and a cathode layer formed on the dielectric. In the stacked solid electrolytic capacitor, the cathode layers of the plurality of stacked solid electrolytic capacitor elements are connected to each other, and the anode sections of the plurality of stacked solid electrolytic capacitor elements are connected to each other. Furthermore, in the stacked solid electrolytic capacitor, a conductive layer extending in the stacking direction is formed on at least part of a side face of an area where the cathode layers of the solid electrolytic capacitor elements are formed.

Preferably, in the above stacked solid electrolytic capacitor, the cathode layers comprise a solid electrolyte having, as a main component, a conductive polymer, an inorganic oxide or a mixture thereof.

Further, the conductive layer may be formed of a conductive paste having, as a main component, conductive particles and a resin.

Preferably, the conductive layer is formed on a lateral side at which the anode section is formed in an extension direction, within the side face, the conductive layer being formed over no less than ⅓ of the surface area of the lateral side face.

Further, the conductive layer may be formed to have a substantially identical width in the stacking direction of the solid electrolytic capacitor elements.

Preferably, the conductive layer is formed on a lateral side face of the solid electrolytic capacitor elements, offset from the center of the lateral side face toward the anode sections.

Preferably, in the above stacked solid electrolytic capacitor, the thickness of the conductive layer may be no smaller than the thickness of the cathode layers formed so as to surround the outer periphery of the solid electrolytic capacitor elements.

Further, in the above stacked solid electrolytic capacitor, the conductive particles may include at least one among copper, silver and a mixture thereof.

Further, in the above stacked solid electrolytic capacitor, the inorganic oxide may be manganese dioxide.

Furthermore, in the above stacked solid electrolytic capacitor, the valve action metal may be at least one among aluminum, niobium and tantalum.

In the present invention, a conductive layer is formed along a side face of stacked solid electrolytic capacitor elements. Therefore, the invention allows providing a stacked solid electrolytic capacitor in which ESR can be reduced by increasing the number of stacked layers. The invention succeeds also in providing a stacked solid electrolytic capacitor having reduced ESL (equivalent series inductance).

The above and other objects, features and advantages of the present invention will become more fully understood from the detailed description given hereinbelow and the accompanying drawings which are given by way of illustration only, and thus are not to be considered as limiting the present invention.

DESCRIPTION OF THE PREFERRED EMBODIMENTS

Figure 1A:
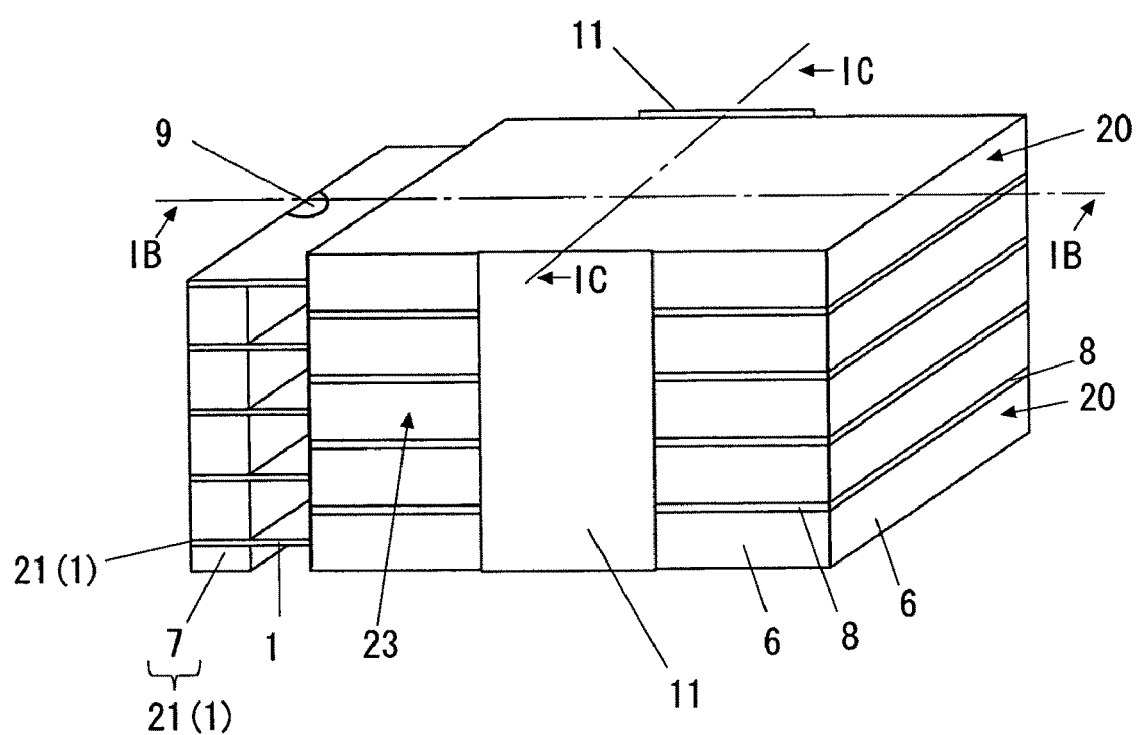
FIG. 1A is a perspective-view diagram of a stacked solid electrolytic capacitor according to Example 1 of the present invention, prior to being encapsulated.

Embodiments to which the present invention is applied are explained hereinafter.

The stacked solid electrolytic capacitor according to the present invention is manufactured, for instance, in accordance with the procedure below. Firstly, a dielectric comprising an oxide of a valve action metal is formed by anodization of the surface of the valve action metal (anode) which is flat and has been subjected to a surface roughening treatment. Then there is formed a resist layer for isolating a cathode section from a non surface-roughened end of the anode that yields an anode section. A cathode layer comprising a solid electrolyte layer, a graphite layer and a silver paste layer are then formed on the dielectric, excluding one end of the anode. Thereafter, an anode piece comprising a Cu base material is ultrasonically welded to the non-surface roughened anode end, to yield a solid electrolytic capacitor element. The solid electrolytic capacitor elements are then stacked in the required number to yield a solid electrolytic capacitor stack (hereinafter referred to as "stack"). The anode sections of the stack are then connected through laser welding. Similarly, the cathode layers are connected by way of a conductive paste. Next, a conductive layer is formed, extending in the stacking direction, on at least part of a side face of an area where the cathode layers of the solid electrolytic capacitor elements are formed. Specifically, a conductive paste is formed by transfer, dispensing or screen printing. The conductive paste is cured after ensuring a certain thickness and formation width. The solid electrolytic capacitor elements are then connected, via a conductive paste, to a lead frame or a mounting substrate having formed thereon anode patterns and cathode patterns, followed by sealing with a resin to yield the stacked solid electrolytic capacitor. Preferably, the conductive layer is formed on a lateral side on which the anode sections are formed, in an extension direction, within side faces of an area where the cathode layers of the solid electrolytic capacitor elements are formed, the conductive layer being formed over no less than ⅓ of the surface area of the lateral side face, as in the below-described examples, since doing so affords a greater ESR and ESL reduction effect, derived from parallel connection, even when there are connected in parallel five or more stacked solid electrolytic capacitor elements. Preferably, moreover, the conductive layer is formed on a lateral side face of the solid electrolytic capacitor elements, offset from the center of the lateral side face toward the anode sections, since doing so affords a greater ESR and ESL reduction effect, derived from parallel connection, even when there are connected in parallel five or more stacked solid electrolytic capacitor elements.

Herein, the solid electrolytic capacitor elements, together with the lead frame, may be just laser-welded to ensure anode conduction, without welding the anode pieces one by one to the elements at the stacked anode sections. As regards the cathode sections, the elements having been coated with a graphite paste may be stacked, and may be dipped collectively then into a conductive paste, to form thereby the stacked cathode sections.

The conductive paste used for forming the conductive layer on a side face of the stack can be, preferably, a silver paste, a copper paste or a solder paste. Preferred among them is a silver paste, in terms of conductivity, contact resistance and handleability.

On account of the greater number of anodes and cathodes and the reduction in ESL through canceling of the magnetic fields of the currents flowing into and out of the element side, the mounting substrate used may be a conversion substrate in which the anode and cathode terminals are arranged in a staggered multi-terminal arrangement. The explanation in the below-described examples relates to a solid electrolytic capacitor in which a conductive layer is formed on a lateral side face on which the anode sections are formed, in an extension direction, within side faces of an area where the cathode layers of the solid electrolytic capacitor elements are formed. However, the effect afforded by the invention can be also achieved when the conductive layer is formed on the side face of a back side, which is the other end side opposite to that of the anode section. The explanation in the below-described examples relates to a solid electrolytic capacitor in which the conductive layer is formed on two lateral side faces on which the anode sections are formed, in an extension direction, within side faces of an area where the cathode layers of the solid electrolytic capacitor elements are formed. However, the effect afforded by the invention can be also achieved when the conductive layer is formed on only one side lateral face.

The Japanese Unexamined Patent Application Publication No. 2007-165777 proposes a manufacturing method in which a stack is made thinner. In this method, the adjacent cathode sections and the conductive layer that makes up an outer peripheral section are integrated as a single material. As the number of stacked layers increases, however, conductive layer distance on the stacked cathode side faces becomes an important consideration, on account of the skin effect, for stacked capacitor elements that are distant from the substrate or lead frame on which outer terminals are formed. The low ESR characteristic is realized more effectively by bringing closer to the anode sections the position at which the conductive layer is formed on the side face of the stack. However, the above-described method for integrating the stack does not disclose the specific thickness, coating position and coating width of the conductive paste being coated onto the side face, and hence the method is not found to be effective enough for lowering ESR and ESL.

EXAMPLES

Examples of the present invention are explained below with reference to accompanying drawings.

Example 1

Figure 1B:
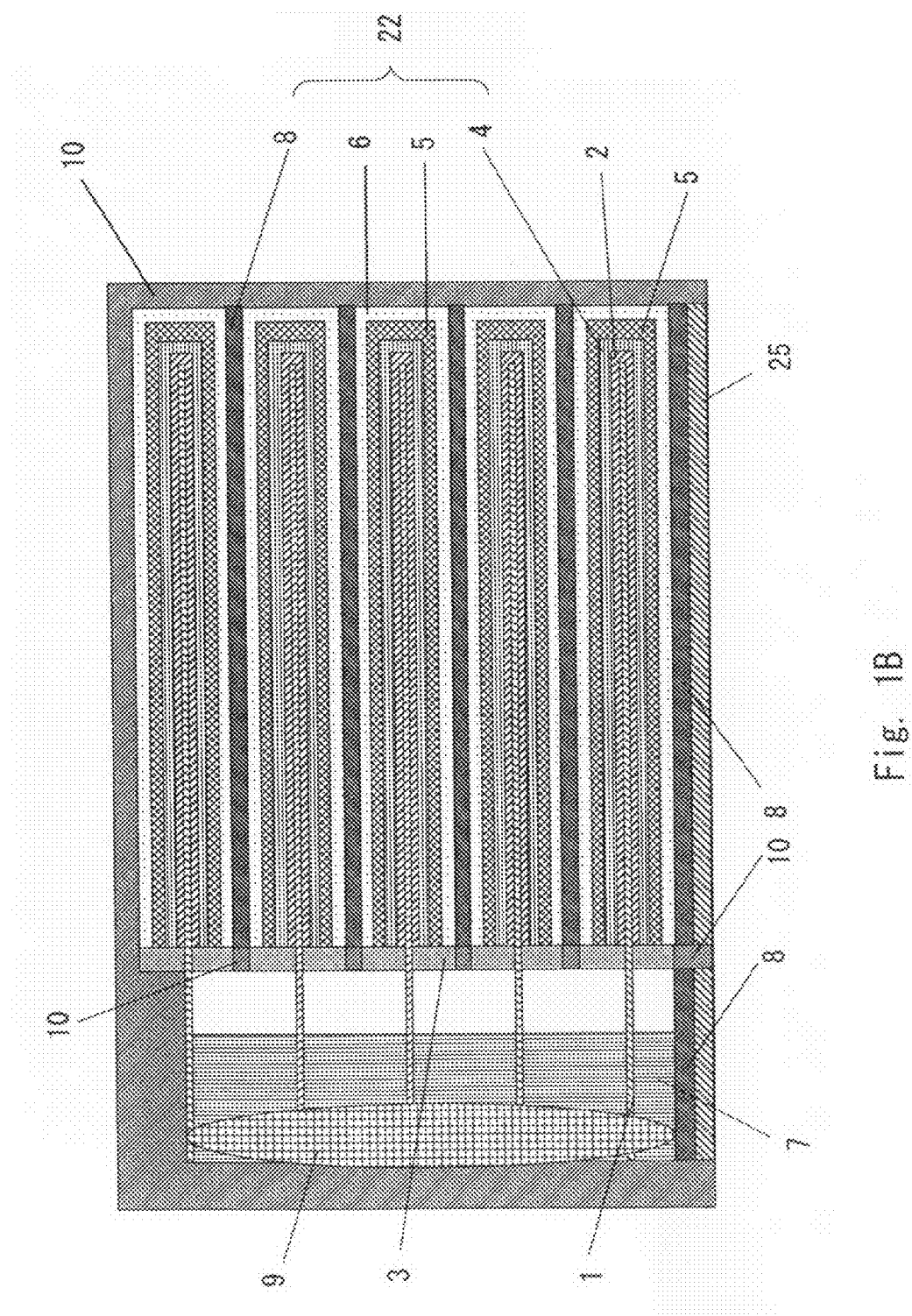
FIG. 1B is a cross-sectional diagram of a section IB-IB in FIG. 1A.
Figure 1C:
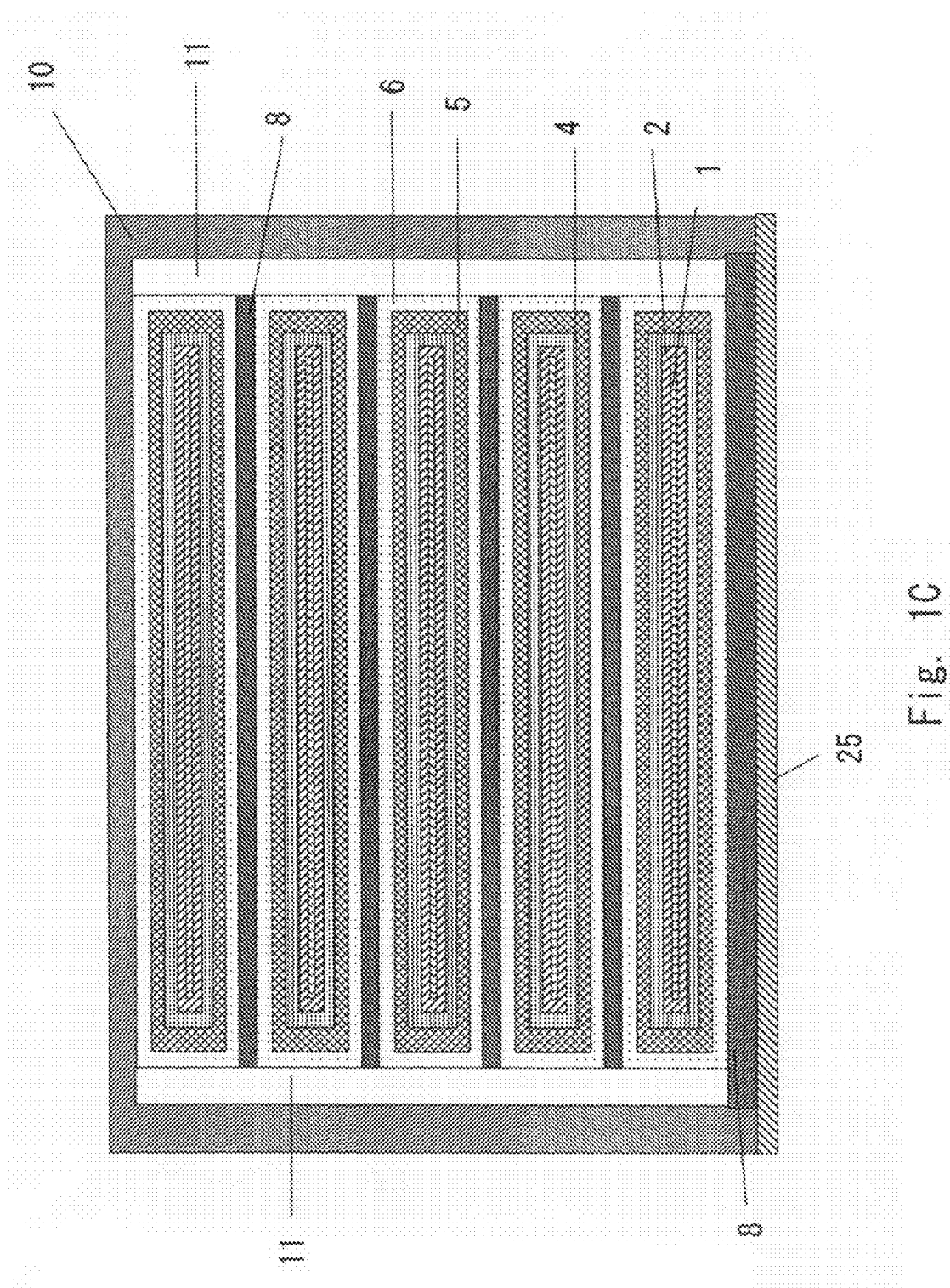
FIG. 1C is a cross-sectional diagram of a section IC-IC in FIG. 1A.

FIG. 1A is a perspective-view diagram of a stacked solid electrolytic capacitor according to Example 1 of the present invention, prior to encapsulation. FIG. 1B is a cross-sectional diagram, corresponding to a section IB-IB in FIG. 1A, of the stacked solid electrolytic capacitor according to Example 1 of the present invention, after encapsulation. Similarly, FIG. 1C is a cross-sectional diagram, corresponding to a section IC-IC in FIG. 1A, of the stacked solid electrolytic capacitor according to Example 1, after encapsulation. Firstly, an anode body 1 (valve action metal) comprising a surface-roughened flat aluminum foil was anodized, to form thereby a dielectric 2 having formed thereon an anodized film. Then there was formed a resist layer 3 for isolating a cathode section from the non surface-roughened end of the anode that yields the anode section. A solid electrolyte 4, comprising a conductive polymer, was formed then on the dielectric 2, followed by formation of graphite 5 and a silver paste 6, to yield a cathode layer. Thereafter, an anode piece 7, obtained by sequentially subjecting a Cu base material to Ni, Cu and Ag plating, was welded, by ultrasonic welding, to the anode end partitioned by the resist layer 3, to yield an anode section 21, and to form thereby an aluminum solid electrolytic capacitor element 20.

A stack was formed then by connecting the cathode layers of solid electrolytic capacitor element 20 using a conductive paste 8. The solid electrolyte 4, the graphite 5, the silver paste 6, and the conductive paste 8 formed between the solid electrolytic capacitor elements 20 function as a cathode layer 22. The stack was formed as a 2-layer to 10-layer stack. The dimensions of a 10-layer stack are 10×15×3.8 mm. Thereafter, part of the anode sections 21 of the aluminum solid electrolytic capacitor elements 20 were connected by laser welding, to form an anode laser welded section 9. Band-like conductive layers 11 were formed then on two lateral side faces 23 on which the anode sections 21 were formed, in an extension direction, within the side faces of the stack on which the cathode layers 22 were formed (FIG. 1A). The conductive layers 11 were formed extending in the stacking direction, on at least part of the side faces of the solid electrolytic capacitor elements 20, in such a manner so as to electrically connect the cathode layers of the solid electrolytic capacitor elements 20. The conductive layers 11 were stacked at the central region of the lateral side faces 23 where the cathode layers 22 were formed, with the conductive layers 11 being formed over ⅓ of the surface area of the lateral side faces. The thickness of the conductive layers 11 was the same as the thickness of the silver paste 6, in this case 10 μm. The material of the conductive layers 11 was a silver paste. Thereafter, the anode sections and the cathode layers were connected to a lead frame 25 via the conductive paste 8, followed by encapsulation with a sealing resin 10, to yield a stacked solid electrolytic capacitor.

Comparative Example 1a

As in Example 1, a stack was formed by connecting the cathode layers of solid electrolytic capacitor elements by way of a conductive paste. Next, an anode laser welded section was formed by connecting, through laser welding, the anode sections. A conductive paste was coated, by dipping, over the entire surface of the cathode layers. Thereafter, as in Example 1, the anode sections and the cathode layers were connected to a lead frame via a conductive paste, followed by encapsulation with a sealing resin, to yield a stacked solid electrolytic capacitor.

Comparative Example 1b

As in Example 1, a stack was formed by connecting the cathode layers of solid electrolytic capacitor elements by way of a conductive paste. Next, an anode laser welded section was formed by connecting, through laser welding, the anode sections. No conductive layer was formed then on the side faces of the solid electrolytic capacitor elements. Thereafter, as in Example 1, the anode sections and the cathode layers were connected to a lead frame via a conductive paste, followed by encapsulation with a sealing resin, to yield a stacked solid electrolytic capacitor.

Figure 2:
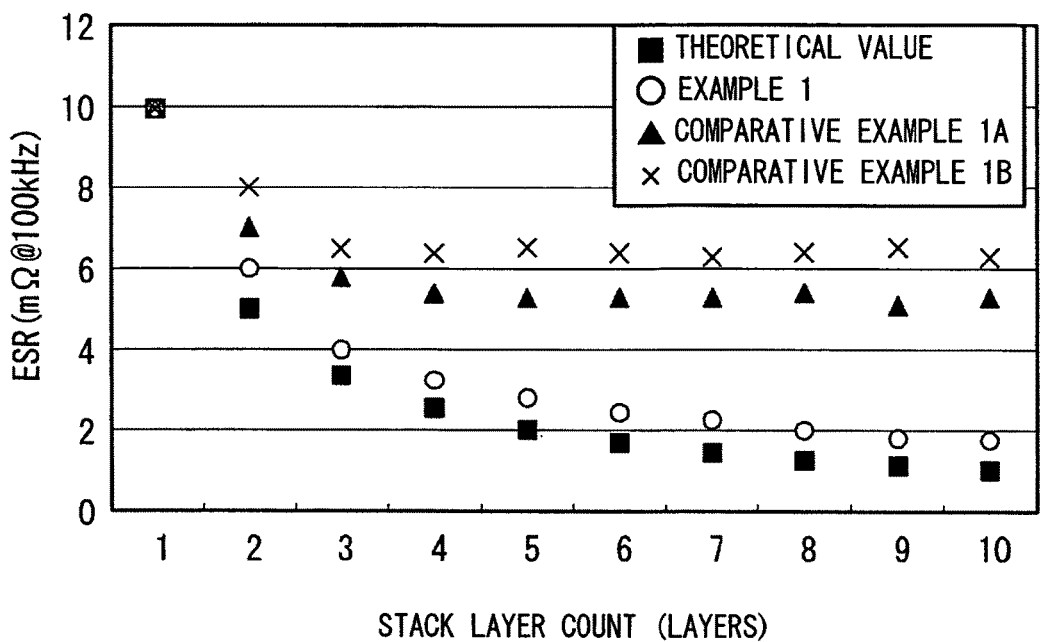
FIG. 2 is a diagram illustrating ESR in Example 1 and Comparative example 1.

The ESR (100 kHz) of the stacked solid electrolytic capacitors manufactured in Example 1 and Comparative examples 1a and 1b were measured. The measurement results are illustrated in FIG. 2. The ESR (100 kHz) of an element single layer before stacking was 10 mΩ. The theoretical value in FIG. 2 is the value denoting the ESR value and the stack layer count based on formula (1).

In a stacked solid electrolytic capacitor of the present invention, having conductive layers formed over ⅓ of the surface area of stacked cathode side faces, to a thickness identical to the thickness of the silver paste formed as the cathode layers, the ESR reduction effect elicited by parallel connection becomes more significant as the number of layers in the stacked solid electrolytic capacitor increases, as FIG. 2 clearly shows.

Example 2

A stacked aluminum solid electrolytic capacitor was manufactured in the same way as in Example 1, but forming the solid electrolyte using manganese dioxide instead of the conductive polymer used in Example 1.

Comparative Example 2a

A stacked aluminum solid electrolytic capacitor was manufactured in the same way as in Comparative example 1a, but forming the solid electrolyte using manganese dioxide instead of the conductive polymer used in Comparative example 1a.

Comparative Example 2b

A stacked aluminum solid electrolytic capacitor was manufactured in the same way as in Comparative example 1b, but forming the solid electrolyte using manganese dioxide instead of the conductive polymer used in Comparative example 1b.

Figure 3:
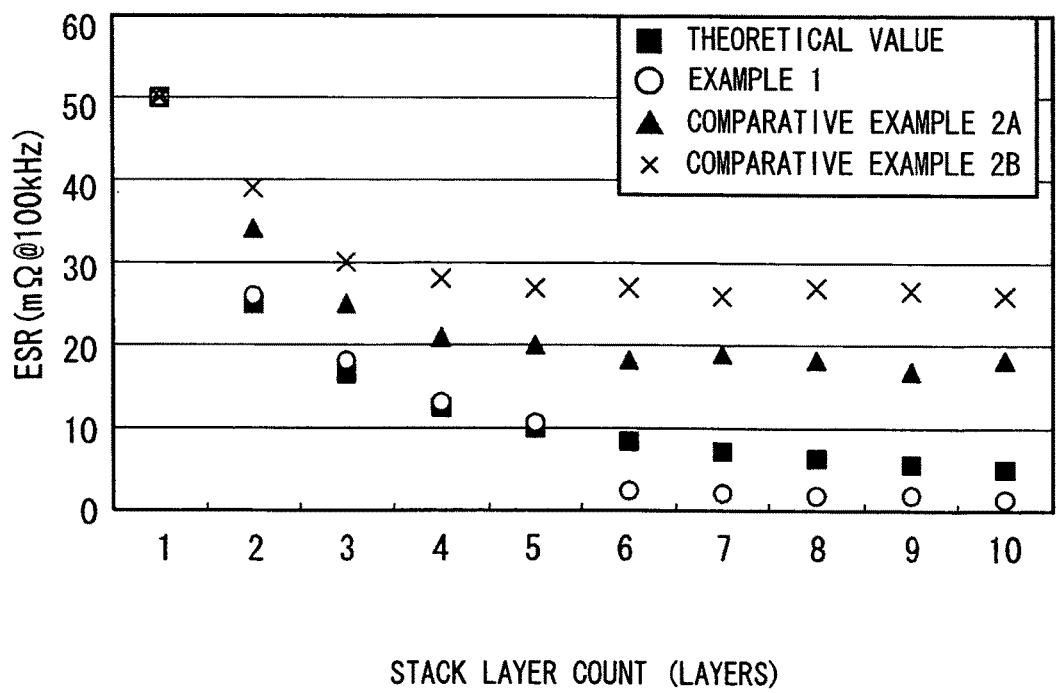
FIG. 3 is a diagram illustrating ESR in Example 2 and Comparative example 2.

The ESR (100 kHz) of the stacked solid electrolytic capacitors manufactured in Example 2 and Comparative examples 2a and 2b were measured. The measurement results are illustrated in FIG. 3. The ESR (100 kHz) of an element single layer before stacking was 50 mΩ. The theoretical value in FIG. 3 is the value denoting the ESR value and the stack layer count based on formula (1).

In a stacked solid electrolytic capacitor of the present invention, having conductive layers formed over ⅓ of the surface area of stacked cathode side faces, to a thickness identical to the thickness of the silver paste formed as the cathode layers, the ESR reduction effect elicited by parallel connection becomes more significant as the number of layers in the stacked solid electrolytic capacitor increases, as FIG. 3 clearly shows, also when the solid electrolyte is manganese dioxide.

Example 3

A 5-layer stack was manufactured after forming aluminum solid electrolytic capacitor elements as in Example 1. Thereafter, parts of the anode sections of the aluminum solid electrolytic capacitor elements were connected by laser welding, to form an anode laser welded section. Thereafter, stacked aluminum solid electrolytic capacitors were manufactured using a silver paste (Example 3a), a copper paste (Example 3b), or a paste comprising a 1:1 mixture of a silver filler and a copper filler (Example 3c), as the conductive layers formed on the central portion of the side faces of the stacked cathode layers.

Comparative Example 3a

A stacked aluminum solid electrolytic capacitor was manufactured in the same way as in Example 3 but using a silver paste, as the conductive paste, formed over the entire surface on the side faces of the cathode layers of the stack.

Comparative Example 3b

A stacked aluminum solid electrolytic capacitor was manufactured in the same way as in Example 3 but without forming conductive layers on the side faces of the cathode layers of the stack.

The ESR (100 kHz) of the stacked solid electrolytic capacitors manufactured in Examples 3a, 3b, 3c and Comparative examples 3a, 3b, were measured. The results are given in Table 1.

TABLE 1

|  | Example 3a | Example 3b | Example 3c | Comp. ex. 3a | Comp. ex. 3b |
|---|---|---|---|---|---|
| Conductive layer formed on side face | Silver paste | Copper paste | Silver:copper = 1:1 | Whole-surface coating | No coating |
| ESR (mΩ@100 kHz) | 2.8 | 3.2 | 3.1 | 5.3 | 6.5 |

Table 1 shows that the effect of the present invention is achieved when the conductive layer 11 formed on a side face of the solid electrolytic capacitor is a conductive layer comprising a resin and at least one among silver, copper and a mixture thereof.

Example 4

A 5-layer stack was manufactured after forming aluminum solid electrolytic capacitor elements as in Example 1. Thereafter, parts of the anode sections of the aluminum solid electrolytic capacitor elements were connected by laser welding, to form an anode laser welded section. Stacked solid electrolytic capacitors were manufactured next in the same way as in Example 1, with the surface area of the conductive layer, formed on the central portion of the lateral side faces among the side faces of the cathode layers of the stack, taking up 1/10 (Example 4a), 1/5 (Example 4b), 1/3 (Example 4c) and 1/2 (Example 4d) of the surface area of the side faces of the cathode body, followed by curing.

Comparative Example 4

A stacked aluminum solid electrolytic capacitor was manufactured in the same way as in Example 4, except that herein there was formed no conductive layer on the cathode layer side faces through whole-surface formation of a conductive paste by dipping.

The ESR (100 kHz) of the stacked solid electrolytic capacitors manufactured in Examples 4a, 4b, 4c, 4d and Comparative example 4 were measured. The results are given in Table 2.

TABLE 2

|  | Example 4a | Example 4b | Example 4c | Example 4d | Comp. ex. 4 |
|---|---|---|---|---|---|
| Formation area/ cathode side face area | 1/10 | 1/5 | 1/3 | 1/2 | No coating |
| ESR (mΩ@100 kHz) | 4.5 | 3.4 | 2.8 | 2.7 | 5.3 |

Example 5

Figure 4:
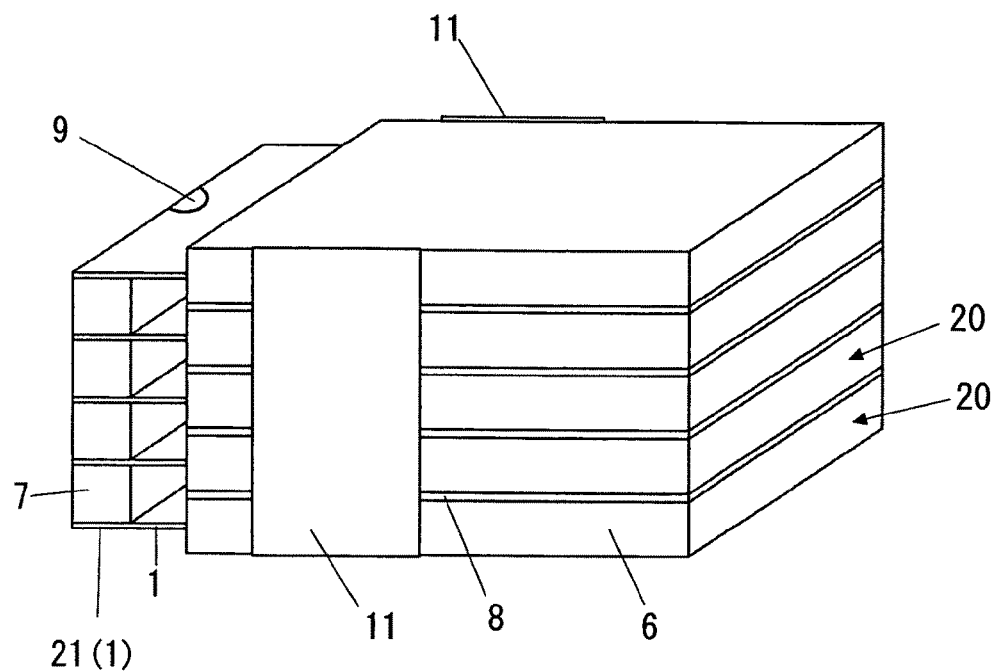
FIG. 4 is a perspective-view diagram illustrating a stack of an aluminum solid electrolytic capacitor of Example 5a of the present invention.
Figure 5:
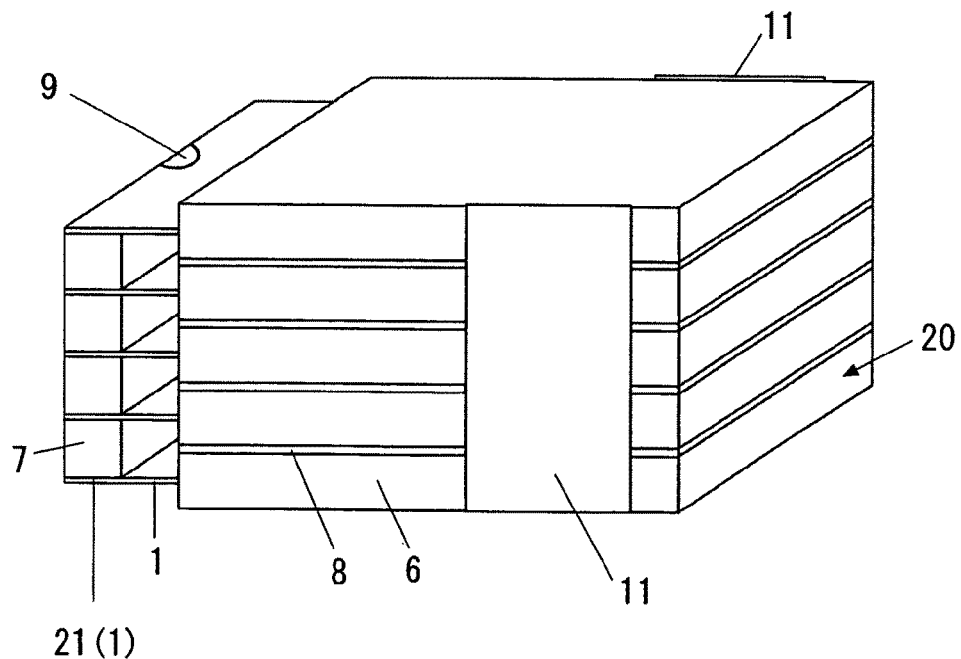
FIG. 5 is a perspective-view diagram illustrating a stack of an aluminum solid electrolytic capacitor of Example 5c of the present invention.

FIG. 4 is a perspective-view diagram illustrating a stack of the aluminum solid electrolytic capacitor of Example 5a of the present invention. FIG. 5 is a perspective-view diagram illustrating a stack of the aluminum solid electrolytic capacitor of Example 5c of the present invention. A 5-layer stack was manufactured after forming aluminum solid electrolytic capacitor elements as in Example 1. Thereafter, parts of the anode sections of the aluminum solid electrolytic capacitor elements were connected by laser welding, to form an anode laser welded section. Conductive layers were then formed over 1/3 of the surface area of the cathode layer side faces of the stack, at a position more toward the anode side than the cathode center, as illustrated in FIG. 4, specifically at a site centered on a position 1/3 distant from the anode side (Example 5a). Similarly, conductive layers were formed on the center of the cathode (Example 5b, FIG. 1), and toward the opposite side of the anode side, specifically at a site centered on a position 2/3 distant from the anode side (Example 5c). The anode and the cathode were connected, via a conductive paste, to a substrate having a built-in lead frame, followed by encapsulation with a sealing resin.

The ESL (200 MHz) of the stacked solid electrolytic capacitors manufactured in Examples 5a, 5b and 5c were measured. The results are given in Table 3.

TABLE 3

|  | Example 5a | Example 5b | Example 5c |
|---|---|---|---|
| Position | Anode side (FIG. 4) | Center (FIG. 1) | Opposite side (FIG. 5) |
| ESL (pH@200 MHz) | 140 | 146 | 265 |

Table 2 shows that forming conductive layers on the side faces elicits an ESR reduction effect, and that the effect afforded by the present invention can be maximized when the surface area over which the conductive layers are formed is no smaller than 1/3 of the surface area of the cathode side faces. Table 3 shows also that positioning the conductive layers formed on the side faces more toward the anode side than the cathode center results in shorter stack current paths, which allows keeping ESL low.

Example 6

Figure 6:
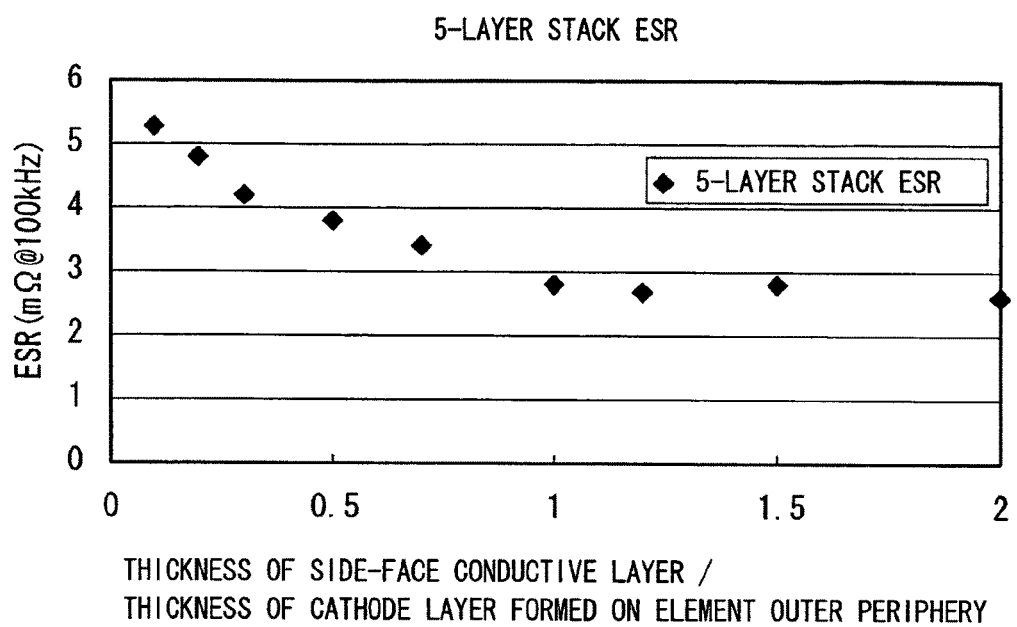
FIG. 6 is a diagram illustrating ESR in Example 6 of the present invention.

A 5-layer stack was manufactured after forming aluminum solid electrolytic capacitor elements as in Example 1. Thereafter, parts of the anode sections of the aluminum solid electrolytic capacitor elements were connected by laser welding, to form an anode laser welded section. Conductive layers were then formed to a thickness ranging from 0.1 to 2.0 times the thickness of the cathode layers (silver paste) formed so as to surround the outer periphery of the solid electrolytic capacitor elements. The anode and the cathode were then connected, via a conductive paste, to a substrate having a built-in lead frame, followed by encapsulation with a sealing resin, after which the ESR (100 kHz) of the capacitor was measured. The measurement results are illustrated in FIG. 6.

The results show that the effect afforded by the present invention is maximized by coating the conductive layer, formed on the side faces, to a conductive layer thickness greater than the thickness of the cathode layers (silver paste) formed so as to surround the outer periphery of the solid electrolytic capacitor elements.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A stacked solid electrolytic capacitor having a plurality of solid electrolytic capacitor elements stacked in a stacking direction,
wherein each solid electrolytic capacitor element comprises an anode formed of a valve action metal,
an anode section formed on an end of the anode,
a dielectric formed on the surface of the valve action metal and comprising an oxide of the valve action metal, and
a cathode layer formed on the dielectric,
the cathode layers of the plurality of stacked solid electrolytic capacitor elements being connected to each other,
the anode sections of the plurality of stacked solid electrolytic capacitor elements being connected to each other,
wherein a conductive layer extending in the stacking direction having a flat outside principal surface is formed on at least part of a side face of an area where the cathode layers of the solid electrolytic capacitor elements are formed,
wherein the conductive layer is formed of a conductive paste having, as a major component, conductive particles and a resin, and is formed only on a side face area of the area where the cathode layers of the solid electrolytic capacitor elements are formed,
wherein no conductive member is provided on the flat outside principal surface of the conductive layer, and
wherein the conductive layer is formed on a lateral side at which the anode section is formed in an extension direction, within the side face, the conductive layer being formed over no less than $1/3$ of the surface area of the lateral side face.

2. The stacked solid electrolytic capacitor according to claim 1, wherein the conductive layer is formed on a lateral side face of the solid electrolytic capacitor elements, offset from the center of the lateral side face toward the anode sections.

3. A stacked solid electrolytic capacitor having a plurality of solid electrolytic capacitor elements stacked in a stacking direction,
wherein each solid electrolytic capacitor element comprises an anode formed of a valve action metal,
an anode section formed on an end of the anode,
a dielectric formed on the surface of the valve action metal and comprising an oxide of the valve action metal, and
a cathode layer formed on the dielectric,
the cathode layers of the plurality of stacked solid electrolytic capacitor elements being connected to each other,
the anode sections of the plurality of stacked solid electrolytic capacitor elements being connected to each other,
wherein a conductive layer extending in the stacking direction having a flat outside principal surface is formed on at least part of a side face of an area where the cathode layers of the solid electrolytic capacitor elements are formed,
wherein the conductive layer is formed of a conductive paste having, as a major component, conductive particles and a resin, and is formed only on a side face area of the area where the cathode layers of the solid electrolytic capacitor elements are formed,
wherein no conductive member is provided on the flat outside principal surface of the conductive layer, and
wherein the conductive layer is formed in an area taking up between $1/10$ or more and $1/2$ or less of an area of a side face of the area where the cathode layers of the solid electrolytic capacitor elements are formed.

4. A stacked solid electrolytic capacitor having a plurality of solid electrolytic capacitor elements stacked in a stacking direction,
wherein each solid electrolytic capacitor element comprises an anode formed of a valve action metal,
an anode section formed on an end of the anode,
a dielectric foamed on the surface of the valve action metal and comprising an oxide of the valve action metal, and
a cathode layer formed on the dielectric,
the cathode layers of the plurality of stacked solid electrolytic capacitor elements being connected to each other,
the anode sections of the plurality of stacked solid electrolytic capacitor elements being connected to each other,
wherein a conductive layer extending in the stacking direction having a flat outside principal surface is formed on at least part of a side face of an area where the cathode layers of the solid electrolytic capacitor elements are formed,
wherein the conductive layer is formed of a conductive paste having, as a major component, conductive particles and a resin, and is formed only on a side face area of the area where the cathode layers of the solid electrolytic capacitor elements are formed,
wherein no conductive member is provided on the flat outside principal surface of the conductive layer, and
wherein the conductive layer is formed in an area taking up between $1/3$ or more and $1/2$ or less of an area of a side face of the area where the cathode layers of the solid electrolytic capacitor elements are formed.

* * * * *